United States Patent
Biondo et al.

(10) Patent No.: US 9,361,739 B2
(45) Date of Patent: Jun. 7, 2016

(54) ODOMETER MONITORING AND REDUNDANT STORAGE SYSTEM

(75) Inventors: William A. Biondo, Bevery Hills, MI (US); David T. Proefke, Troy, MI (US); Kevin E. Fondaw, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 405 days.

(21) Appl. No.: 13/403,365

(22) Filed: Feb. 23, 2012

(65) Prior Publication Data

US 2013/0226366 A1 Aug. 29, 2013

(51) Int. Cl.
| | |
|---|---|
| *G01M 17/00* | (2006.01) |
| *G06F 7/00* | (2006.01) |
| *G06F 19/00* | (2011.01) |
| *G07C 5/08* | (2006.01) |
| *G06Q 10/10* | (2012.01) |
| *G01C 22/02* | (2006.01) |
| *G07C 5/00* | (2006.01) |

(52) U.S. Cl.
CPC ............. *G07C 5/085* (2013.01); *G01C 22/02* (2013.01); *G06Q 10/10* (2013.01); *G07C 5/008* (2013.01); *G07C 5/0858* (2013.01)

(58) Field of Classification Search
CPC .......... G07C 5/08; G07C 5/085; G07C 5/008; G07C 5/00; G07C 5/0858; G07B 13/00; G06F 7/00
USPC ............. 701/1, 33.4, 33.9, 32.5, 36, 37, 33.3, 701/33.6
See application file for complete search history.

(56) References Cited

U.S. PATENT DOCUMENTS

| | | | | |
|---|---|---|---|---|
| 5,924,057 | A * | 7/1999 | Kell | 702/165 |
| 6,519,516 | B2 * | 2/2003 | Pfaeffle et al. | 701/32.6 |
| 6,768,966 | B2 * | 7/2004 | Ohle et al. | 702/165 |
| 6,772,090 | B2 * | 8/2004 | Hutton et al. | 702/165 |

(Continued)

FOREIGN PATENT DOCUMENTS

| | | |
|---|---|---|
| CN | 1979255 A | 6/2007 |
| DE | 19919501 A1 | 6/2000 |

(Continued)

OTHER PUBLICATIONS

Chinese Office Action for Application No. 201310056420.7 Issued Feb. 2, 2015, 7 pages.

*Primary Examiner* — Jason Holloway
*Assistant Examiner* — Rachid Bendidi
(74) *Attorney, Agent, or Firm* — Cantor Colburn LLP

(57) ABSTRACT

A vehicle control system includes a computer and logic executable by the computer. The logic is configured to read an odometer value from a storage system. The odometer value corresponds to an accrued mileage obtained from an odometer. The accrued mileage is determined at a beginning of a current driving event. The logic is also configured to read an odometer value for the vehicle from another storage system. The odometer value from the other storage system corresponds to an accrued mileage obtained from the storage system at the beginning of a driving event that precedes the current driving event. The logic is further configured to compare the odometer value from the storage system to the odometer value from the other storage system and calculate a reduction value from the difference, upon determining the odometer value from the other storage system is greater than the odometer value from the storage system.

20 Claims, 3 Drawing Sheets

(56) References Cited

U.S. PATENT DOCUMENTS

| | | | |
|---|---|---|---|
| 6,856,933 B1* | 2/2005 | Callaghan | 702/149 |
| 6,961,671 B2* | 11/2005 | Ko | 702/168 |
| 6,980,923 B1* | 12/2005 | Manakkal | 702/165 |
| 7,505,838 B2* | 3/2009 | Raines et al. | 701/33.4 |
| 7,610,128 B2* | 10/2009 | O'Connor et al. | 701/32.5 |
| 2005/0099275 A1* | 5/2005 | Kamdar et al. | 340/426.18 |
| 2005/0137796 A1* | 6/2005 | Gumpinger | 701/211 |
| 2006/0009885 A1 | 1/2006 | Raines et al. | |
| 2008/0189006 A1* | 8/2008 | Meehan et al. | 701/29 |
| 2009/0118899 A1* | 5/2009 | Carlson | 701/35 |
| 2010/0117960 A1* | 5/2010 | Huntzicker et al. | 345/158 |
| 2010/0304690 A1* | 12/2010 | Proefke et al. | 455/69 |
| 2012/0109448 A1* | 5/2012 | Maas et al. | 701/32.5 |
| 2012/0197484 A1* | 8/2012 | Nath et al. | 701/32.4 |

FOREIGN PATENT DOCUMENTS

| | | |
|---|---|---|
| DE | 102006041765 B4 | 7/2008 |
| WO | 2011000533 A1 | 1/2011 |

\* cited by examiner

300A

| | START DE 1 | START DE 2 | START DE 3 | START DE 4 | START DE 5 | START DE 6 | START DE 7 |
|---|---|---|---|---|---|---|---|
| ODOMETER | 17,409 | 17,427 | 17,435 | 9,527 | 9,544 | 9,583 | 9,624 |
| DATE OF DE | 7/27/2005 | 7/27/2005 | 7/27/2005 | 7/29/2005 | 7/29/2005 | 7/31/2005 | 8/1/2005 |
| KEY USED | KEY 1 | KEY 1 | KEY 2 | KEY 1 | KEY 2 | KEY 2 | KEY 2 |

| | START DE 1 | START DE 2 | START DE 3 | START DE 4 | START DE 5 | START DE 6 | START DE 7 |
|---|---|---|---|---|---|---|---|
| ODOMETER AT LAST USE | 17,409 | 17,427 | 17,435 | 9,527 | 9,544 | 9,583 | 9,624 |
| DATE LAST USED | 7/27/2005 | 7/27/2005 | 7/27/2005 | 7/29/2005 | 7/29/2005 | 7/31/2005 | 8/1/2005 |
| MAX ODOMETER VALUE | 17,409 | 17,427 | 17,435 | 17,427 | 17,435 | 17,435 | 17,435 |
| DATE OF MAX VALUE | 7/27/2005 | 7/27/2005 | 7/27/2005 | 7/29/2005 | 7/29/2005 | 7/29/2005 | 7/29/2005 |
| CUMULATIVE REDUCTION | 0 | 0 | 0 | 7,900 | 7,891 | 7,891 | 7,891 |
| DATE OF LAST REDUCTION | N/A | N/A | N/A | 7/29/2005 | 7/29/2005 | 7/29/2005 | 7/29/2005 |

FIG. 3B

ODOMETER MONITORING AND
REDUNDANT STORAGE SYSTEM

FIELD OF THE INVENTION

The subject invention relates to data processing and, more particularly, to a vehicle odometer monitoring and redundant data storage system.

BACKGROUND

In order to maximize resale or trade in values, mileage rollback techniques that reduce the actual mileage values incurred on a vehicle and reflected on a vehicle's odometer have become increasingly popular. Such activities can significantly impact profits for various industries (e.g., vehicle manufacturers and resellers, insurance companies, leasing companies, etc.) in terms of warranty claims paid out on vehicles that would not otherwise be covered under the warranty due to inaccurate mileage readings, loss of over-mileage collection fees for leased vehicles, as well as diminished residual value of a vehicle due to inaccurate mileage disclosure in a used car market.

What is needed, therefore, is a way to monitor odometer values as recoverable data for identifying mileage rollback activities.

SUMMARY OF THE INVENTION

In one exemplary embodiment of the invention a system for odometer monitoring includes a vehicle control system. The vehicle control system includes a computer processor and logic executable by the computer processor. The logic is configured to implement a method. The method includes reading an odometer value for a vehicle from a first storage system, the odometer value corresponding to an accrued mileage obtained from an odometer, and the accrued mileage is determined at a beginning of a current driving event. The method also includes reading an odometer value for the vehicle from a second storage system. The odometer value from the second storage system corresponds to an accrued mileage obtained from the first storage system at the beginning of a driving event that precedes the current driving event. The method further includes comparing the odometer value from the first storage system to the odometer value from the second storage system and calculating a reduction value from the difference between the odometer value from the first storage system and the odometer value from the second storage system. The calculating is performed in response to the comparing and upon determining the odometer value from the second storage system is greater than the odometer value from the first storage system. The reduction value is indicative of a mileage rollback event with respect to the odometer. The method also includes storing the reduction value, a date in which the reduction value is calculated, and a location of the vehicle in the second storage system.

In another exemplary embodiment of the invention, a method for odometer monitoring is provided. The method includes reading, via a computer processor, an odometer value for a vehicle from a first storage system, the odometer value corresponding to an accrued mileage obtained from an odometer, and the accrued mileage is determined at a beginning of a current driving event. The method also includes reading an odometer value for the vehicle from a second storage system. The odometer value from the second storage system corresponds to an accrued mileage obtained from the first storage system at the beginning of a driving event that precedes the current driving event. The method further includes comparing, via the computer processor, the odometer value from the first storage system to the odometer value from the second storage system and calculating a reduction value from the difference between the odometer value from the first storage system and the odometer value from the second storage system. The calculating is performed in response to the comparing and upon determining the odometer value from the second storage system is greater than the odometer value from the first storage system. The reduction value is indicative of a mileage rollback event with respect to the odometer. The method also includes storing the reduction value, a date in which the reduction value is calculated, and a location of the vehicle in the second storage system.

In yet another exemplary embodiment of the invention, a computer program product for odometer monitoring is provided. The computer program product includes a computer-readable storage medium having instructions embodied thereon, which when executed by a computer cause the computer to implement a method. The method includes reading an odometer value for a vehicle from a first storage system, the odometer value corresponding to an accrued mileage obtained from an odometer, and the accrued mileage is determined at a beginning of a current driving event. The method also includes reading an odometer value for the vehicle from a second storage system. The odometer value from the second storage system corresponds to an accrued mileage obtained from the first storage system at the beginning of a driving event that precedes the current driving event. The method further includes comparing the odometer value from the first storage system to the odometer value from the second storage system and calculating a reduction value from the difference between the odometer value from the first storage system and the odometer value from the second storage system. The calculating is performed in response to the comparing and upon determining the odometer value from the second storage system is greater than the odometer value from the first storage system. The reduction value is indicative of a mileage rollback event with respect to the odometer. The method also includes storing the reduction value, a date in which the reduction value is calculated, and a location of the vehicle in the second storage system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIGS. 3A-3B are diagrams with sample data recorded and processed by the odometer monitoring system in accordance with an exemplary embodiment of the invention.

DESCRIPTION OF THE EMBODIMENTS

Figure 1:
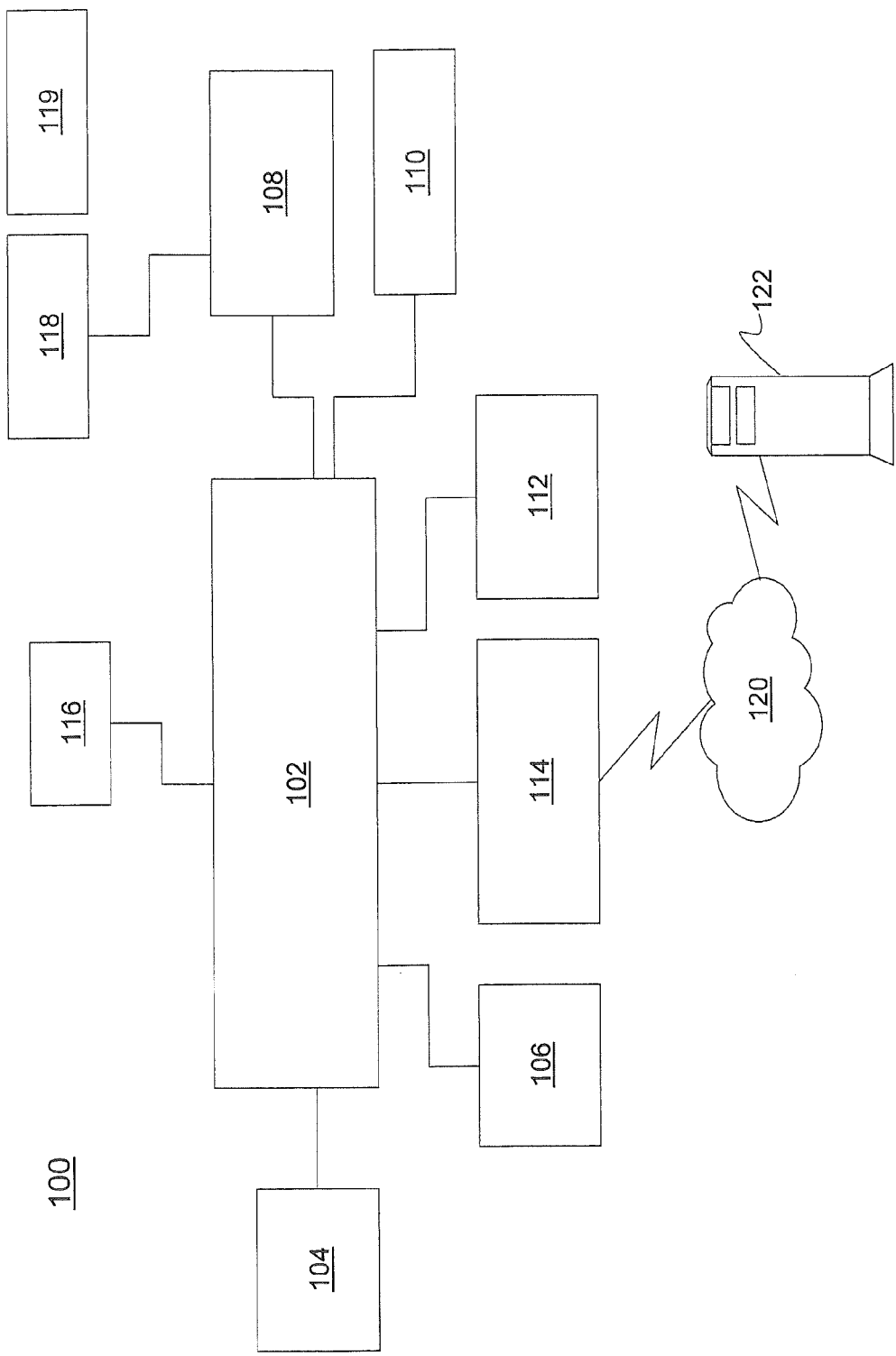
FIG. 1 is a block diagram of a system upon which odometer monitoring may be implemented in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, odometer monitoring of a vehicle is provided. The odometer monitoring records and processes vehicle odometer values, as well as other information, as recoverable data for identifying mileage rollback activities. The recorded data may be used to ensure accurate mileage readings for use in authorizing warranty claims, determining over-mileage fees in a leasing activity, and ensuring a fair resale value is applied to a vehicle based on accurate mileage incurred on the vehicle.

Turning now to FIG. 1, a system 100 upon which the odometer monitoring may be implemented will now be described in an embodiment. The system 100 relates to a portion of a vehicle including components used in performing the odometer monitoring. The vehicle may be any type of automobile known in the art. As shown in FIG. 1, the system 100 includes a control system 102 that is communicatively coupled (e.g., through wiring) to a memory 104, a timer 106, and communications components 114. The control system 102 is also communicatively coupled (e.g., through wiring) to an ignition system 108, an odometer 110, and vehicle components 112.

The system 100 includes two key fobs 118 and 119. For illustrative purposes, the key fob 118 is shown to be engaged with the ignition system 108. It will be understood that multiple key fobs, or alternatively a single key fob, may be utilized in order to realize the advantages of the exemplary odometer monitoring processes described herein. The key fobs 118 and 119 include memory for storing odometer values and other information, as will be described further herein.

The control system 102 may be implemented in part by a computer processor that executes logic 116 for performing the exemplary odometer monitoring described herein. The memory 104 may be implemented as a storage device (e.g., hard disk drive or solid state memory) that stores data collected via the logic 116 and other vehicle elements, as described herein. For example, the memory 104 stores information pertaining to driving events, a sample of which is shown in a diagram 300A of FIG. 3A. As shown in FIG. 3A, the memory 104 stores odometer values logged by the logic 116, as well as dates in which these values are logged. In one embodiment, the memory 104 also stores an identifier of the key fob used in each of the logged driving events. A driving event may be defined as a trip (e.g., initiated by placing a key in the ignition system 108 and starting the vehicle engine, and completed by turning off the engine and removing the key).

In an embodiment, the control system 102 acquires data from each of the ignition system 108, the odometer 110, the vehicle components 112, the communications components 114, the timer 106, and the memory 104, which data is processed by the logic 116 to identify the occurrence of a mileage rollback event. For example, data from the ignition system 108 may include a signal indicative of the initiation or completion of a driving event, as well as an identifier of the key fob used in the driving event. Data from the odometer 110 includes a current mileage accrued (e.g., determined by reading the odometer 110 at the beginning of a driving event). The currently mileage information is referred to herein as an "odometer value." The timer 106 may be used to ascertain a date and time of each driving event. Alternatively, or in addition thereto, the date and time may be captured by global positioning system (GPS) components (e.g., one of communications components 114).

The control system 102 monitors mileage from the odometer 110 via the logic 116, which logic 116 may be configured to log the odometer values using the timer 106 to ascertain a corresponding time of the odometer values. The odometer values may be logged either periodically or upon the occurrence of some triggering event. As indicated above, the odometer value may be logged at the beginning of a driving event (e.g., upon placing a key in the ignition system 108 and starting the vehicle engine). Other methods may alternatively be used to trigger the collection of an odometer value. For example, the communications components 114 may be used as the timing mechanism for triggering the recording of the odometer values (e.g., through GPS when the vehicle reaches a particular location or destination).

The odometer values may be logged in redundant storage and encrypted by the logic 116 in order to ensure the security and integrity of the data. Various storage facilities may be used as the redundant storage. For example, the odometer values may be stored in one or more of the memory 104, a key (e.g., key fobs 118 and 119) communicatively coupled to the ignition system 108, and an external storage device. The external storage device may reside in a network. For example, as shown in FIG. 1, the communications components 114 may receive the odometer values either directly from the logic 116 in real time or may retrieve stored odometer values from the memory 104 and transmit the values over a network 120 to a centralized data collection system 122.

Other types of data may be used to augment the odometer values in assessing a mileage rollback event. For example, one of the vehicle components 112 may be an engine sensor that provides a quantity of time that an engine has been active or engaged. This information may be useful, in conjunction with the noted changes in the odometer values, in evaluating any discrepancies or speculations concerning changes in the odometer values. For example, if the vehicle generally logs 1,000 miles per month, but the logic 116 detects no mileage accrual for three consecutive weeks, the logic 116 may be configured to check the engine hours logged to see if the vehicle has been inactive for that period of time. If the engine hours logged indicate significant activity during those three weeks, then this may be an indicator that a mileage rollback event has occurred.

In addition, other data collected may include the location and date of the odometer value recording. The location and date may be captured by one of the communications components 114 (e.g., GPS, cellular components, etc.). By tracking the location and date of the odometer value readings, the logic 116 may better understand the changes in the readings (accumulation or reduction) over a time horizon for use in evaluating a potential mileage rollback event.

The communications components 114 send and receive communications to the vehicle through the control system 102. The communications components 114 may include one or more of a navigation system, a roadside assistance system (e.g., OnStar™), a cellular communications system, and a short-range communications system. The network 120 may include any type of network, e.g., Internet, private network, wide area network, etc. In an embodiment, the data collection system 122 may be implemented as a high-speed computer processing device (e.g., mainframe computer) capable of handling the volume of data conducted between itself and the vehicles subject to the odometer value monitoring processes.

Figure 2:
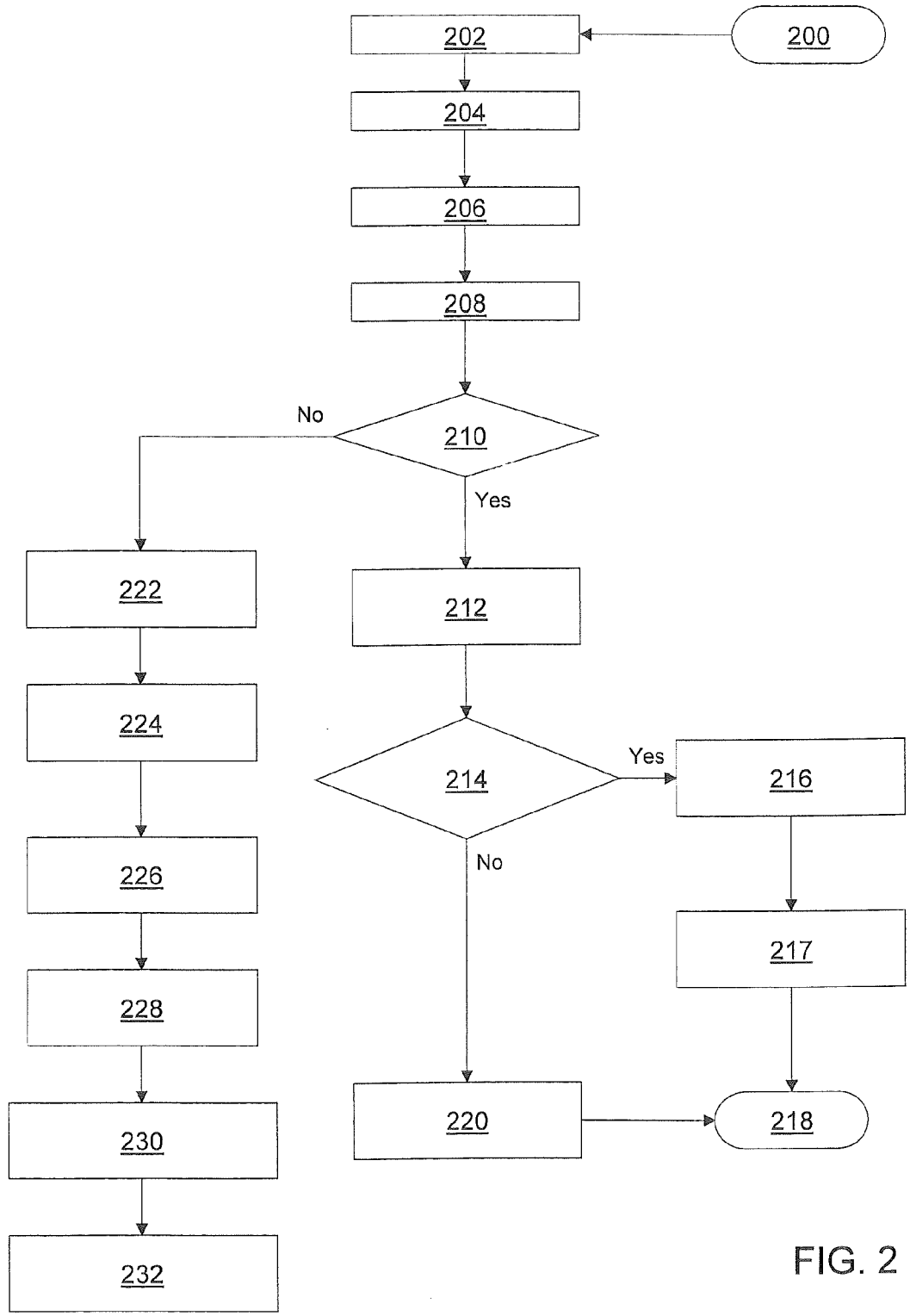
FIG. 2 is a flow diagram of a process for implementing odometer monitoring in accordance with an embodiment of the invention.

Turning now to FIG. 2, a process for implementing the odometer monitoring will now be described in an embodiment of the invention. The processes described in FIG. 2 assume that two key fobs (identified as key 1 and key 2) are used for a vehicle and that a driving event has been initiated using one of the key fobs (illustrated here as key fob 118).

The process begins in step 200 whereby the logic 116 reads the odometer value stored on the vehicle's key fob 118 at step 202. The odometer value stored on the vehicle's key fob 118 represents the most recent odometer reading recorded from the odometer 110 (i.e., the beginning odometer reading acquired from the most recent driving event in which the key fob 118 was used, whereby the odometer reading is recorded and stored on the key fob for each driving event).

The logic 116 also reads the odometer value provided by the odometer 110 via the control system 102 at step 204. This odometer value reflects the current reading of the odometer 110 in the vehicle taken at the beginning of the driving event.

The logic 116 reads from memory 104 the date in which the key fob 118 was last used (e.g., the date of the last driving event in which the key fob 118 was used) at step 206. In an embodiment, in order to enhance data integrity the logic 116 may store and maintain dates for a most recent number of driving events within the memory 104 and key fobs 118 and 119. At step 208, the logic 116 stores the current date in the key fob, as the date in which the key fob 118 was last used.

At step 210, the logic 116 compares the odometer value read from the key fob 118 with the odometer value stored in the memory 104 and determines which value is greater. If the key fob 118 value is less than (or equal to, e.g., in the event a driving event has incurred no appreciable mileage) the odometer value from the memory 104, this is indicative of normal usage, and the odometer value from the memory 104 is stored in the key fob 118 at step 212 to establish the most recent odometer value for the key fob 118.

At step 214, the logic 116 then determines if a maximum odometer value from the key fob 118 is less than the current odometer value stored in the memory 104. The maximum odometer value stored in the key fob 118 represents the highest value recorded for mileage accrued on the vehicle. If the maximum odometer value from the key fob 118 is less than the current odometer value stored in memory 104, this is indicative of normal usage, and the logic 116 stores the current odometer value in the key fob 118 as the maximum odometer value at step 216, and also stores the current date as the date of maximum odometer value (i.e., the date of the highest recorded odometer value) at step 217, and the process ends at step 218. Otherwise, if the maximum odometer value stored in the key fob 18 is greater than the current odometer value stored in the memory 104, this is indicative of an odometer discrepancy, and the logic 116 maintains the maximum odometer value in the key fob 118 at step 220, which is used to highlight the mileage present when the discrepancy or manipulation of the odometer 110 occurred. The process ends at step 218.

Returning to step 208, if the current odometer value stored in the key fob 118 is greater than the current odometer value stored in the memory 104, indicative of an odometer rollback, the logic 116 reads the reduction value from the key fob 118 at step 222, and calculates a new total reduction value at step 224. The new total reduction value is equal to the prior reduction value plus the difference between the current odometer value and the current key fob value.

The logic 116 stores the new total reduction value in the key fob 118 at step 226, and stores the new current odometer value to the key fob 118 at step 228. The logic 116 also stores the date of the key fob's last reduction to the key fob 118 at step 230. The logic 116 also stores the location of the vehicle at the time of the key fob's last reduction update to the key fob 118 at step 232. In one embodiment, the date and location for all detected reduction events could be stored in the key fob, including those for the last reduction event. In a further embodiment, the time may be stored in addition to the date and location for all events.

While the above processes are described with respect to key fobs 118 and 119 used in the exemplary odometer monitoring system, it will be understood that other devices may be used in lieu of the key fobs, and that the key fobs 118 and 119 are provided herein as non-limiting examples and are not to be construed as limiting in scope. For example, other devices, such as smart phones may be used as redundant storage mechanisms whereby unique identifiers associated with each smart phone (e.g., a subscriber identity module (SIM) card may be used to identify driving events in lieu of the key fob identifier.

FIG. 3A is a diagram 300A depicting sample data that is stored in the memory 104 of the vehicle, and FIG. 3B is a diagram 300B depicting sample data that is stored in the key fobs 118 and 119, which are illustrated in FIGS. 3A and 3B as "key 1" and "key 2," respectively.

Turning now to FIG. 3A, data for seven driving events, illustrated as DE 1 through DE 7, have been logged in the memory 104. The data for each driving event includes an odometer reading taken at the beginning of the driving event, the date of the driving event, and the key used for the driving event.

As shown in FIG. 3B, data is recorded and processed for each of the driving events DE 1 through DE 7, where each of the driving events represented as columns in FIG. 3A correspond to a respective column in FIG. 3B, as illustrated by dotted lines between the diagrams 300A and 300B. The data shown in FIG. 3B is stored in respective key fobs 118 (key 1) and 119 (key 2).

As shown in FIGS. 3A and 3B, three driving events, DE 1 through DE 3 occur with no discrepancies or mileage rollback incidents. At the beginning of driving event 4 (DE 4), the odometer value recorded in the memory 104 (in diagram 300A) indicates an overall reduction in total mileage from driving event 3 (DE 3). In particular, the odometer value recorded for the odometer 110 at the beginning of DE 3 shows an accrued mileage of 17,435, while the odometer value shown at the beginning of DE 4 shows a mileage accrual of 9,527.

Applying the processes described in FIG. 2, at the beginning of DE 4, in which key fob 118 (key 1) is used to initiate the trip, the logic 116 reads the current odometer value from key 1. The current odometer value stored in key 1 reflects the most recent odometer value recorded in key 1. In this example, key 1 was last used for DE 2, and the last recorded odometer value was 17,427.

The logic 116 reads the current odometer value recorded in the memory 104. The current odometer value recorded in memory 104 reflects the odometer value read from the odometer 110 at the beginning of the driving event DE 4. The logic 116 identifies the current date (e.g., from the timer 106) and stores this date as the date in which the key 1 was last used (i.e., "DATE LAST USED" shown in FIG. 3B). As shown in the diagram 300B, e.g., the date of last use for DE 4 is Jul. 29, 2005.

The logic 116 compares the odometer value from key 1 with the odometer value stored in the memory 104. As the odometer value from key 1 (i.e., 17,427) is greater than the odometer value from the memory 104 (i.e., 9,527), this indicates a discrepancy. In this instance, the logic 116 reads a reduction value stored in key 1 for the most recent driving event (i.e., from DE 2), which is shown in FIG. 3B as '0,' indicating no previous discrepancy has occurred for the mileage on this vehicle. The logic 116 calculates a new reduction value by subtracting the odometer value stored in the memory 104 from the odometer value stored in key 1. The difference is the new reduction value. If a previous reduction value had been calculated, this number would be added to the difference between the key 1 odometer value and the odometer value stored in the memory 104. The new reduction value is stored in key 1 (i.e., in a row labeled "CUMULATIVE REDUCTION" and in a column corresponding to DE 4), along with the date of the new reduction (i.e., in a row labeled "DATE OF LAST REDUCTION" and in the column corresponding to DE 4).

In one embodiment, the location of the vehicle may be stored in key 1 (not shown). The location of the vehicle may be derived from the communication components 114 as described above, and may be used to further assess whether a rollback event has occurred. For example, changes determined in the location of the vehicle would indicate movement (and therefore, mileage accrual) which would indicate the occurrence of driving events when the odometer 110 readings do not indicate such driving events.

Technical effects of the invention include monitoring and recording vehicle odometer values as recoverable data for identifying mileage rollback activities. The recorded data may be used to ensure accurate mileage readings for use in authorizing warranty claims, determining over-mileage fees in a leasing activity, and ensuring a fair resale value is applied to a vehicle based on accurate mileage incurred on the vehicle. The recorded data is encrypted and stored in redundant storage systems to provide multiple resources for evaluating potential mileage rollback events.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system, comprising:
   a vehicle control system including a computer processor, the computer processor communicatively coupled to an odometer, the computer processor configured to implement a method, the method comprising:
   reading an odometer value for a vehicle from a first storage system, the odometer value corresponding to an accrued mileage obtained from the odometer, the accrued mileage determined at a beginning of a current driving event, the first storage system configured to track all accrued mileage from the odometer;
   reading an odometer value for the vehicle from a second, portable storage system, the odometer value from the second storage system corresponding to a mileage reading obtained for the vehicle at the beginning of a driving event that precedes the current driving event, the second, portable storage system comprising one of a plurality of secondary, portable storage systems, wherein each of the plurality of secondary, portable storage systems store accrued mileage attributable to a driving event associated with a corresponding one of the plurality of secondary, portable storage systems;
   comparing the odometer value from the first storage system to the odometer value from the one of the plurality of secondary, portable storage systems;
   calculating a reduction value from the difference between the odometer value from the first storage system and the odometer value from the one of the plurality of secondary, portable storage systems, in response to the comparing and upon determining the odometer value from the one of the plurality of secondary, portable storage systems is greater than the odometer value from the first storage system, the reduction value indicative of a mileage rollback event with respect to the odometer; and
   storing the reduction value in the one of the plurality of secondary, portable storage systems.

2. The system of claim 1, wherein the first storage system is a memory device internal to the vehicle control system.

3. The system of claim 1, wherein the one of the plurality of secondary, portable storage systems comprises a memory device internal to at least one of:
   a key fob; and
   a smart phone;
   wherein the storing further includes storing a date in which the reduction value is calculated and a location of the vehicle in the second storage system.

4. The system of claim 1, wherein the one of the plurality of secondary, portable storage systems comprises a key fob, and wherein storing the reduction value and the date in which the reduction value is calculated is performed when the key fob is placed in an ignition system of the vehicle.

5. The system of claim 1, wherein the computer processor is further configured to implement:
   storing the odometer value from the first storage system in the one of the plurality of secondary, portable storage systems, in response to the comparing and upon determining the odometer value from the one of the plurality of secondary, portable storage is less than or equal to the odometer value from the first storage system.

6. The system of claim 5, wherein the computer processor is further configured to implement:
   comparing a maximum odometer value stored in the one of the plurality of secondary, portable storage systems to the odometer value stored in the first storage system; and
   upon determining the maximum odometer value is less than the odometer value from the first storage system, storing the odometer value from the first storage system as a new maximum odometer value in the one of the plurality of secondary, portable storage systems.

7. The system of claim 1, wherein the computer processor is further configured to implement:
    distinguishing driving events among multiple ones of the plurality of secondary, portable storage systems, each of the ones of the plurality of secondary, portable storage systems having an identifier stored thereon, including distinguishing odometer values stored on each of the one of the plurality of secondary, portable storage systems according to the respective identifier.

8. A method, comprising:
    reading, via an odometer that is communicatively coupled to a computer processor of a vehicle control system, an odometer value for the vehicle from a first storage system, the odometer value corresponding to an accrued mileage obtained from the odometer, the accrued mileage determined at a beginning of a current driving event, the first storage system configured to track all accrued mileage from the odometer;
    reading an odometer value for the vehicle from a second, portable storage system, the odometer value from the second storage system corresponding to a mileage reading obtained for the vehicle at the beginning of a driving event that precedes the current driving event, the second, portable storage system comprising one of a plurality of secondary, portable storage systems, wherein each of the plurality of secondary, portable storage systems store accrued mileage attributable to a driving event associated with a corresponding one of the plurality of secondary, portable storage systems;
    comparing, via the computer processor, the odometer value from the first storage system to the odometer value from the one of the plurality of secondary, portable storage systems;
    calculating, via the computer processor, a reduction value from the difference between the odometer value from the first storage system and the odometer value from the one of the plurality of secondary, portable storage systems, in response to the comparing and upon determining the odometer value from the one of the plurality of secondary, portable storage systems is greater than the odometer value from the first storage system, the reduction value indicative of a mileage rollback event with respect to the odometer; and
    storing the reduction value in the one of the plurality of secondary, portable storage systems.

9. The method of claim 8, wherein the first storage system is a memory device internal to the vehicle control system.

10. The method of claim 8, wherein the one of the plurality of secondary, portable storage systems comprises a memory device internal to at least one of a key fob and a smart phone, the method further comprising transmitting the reduction value to a central collection system over a network.

11. The method of claim 8, wherein the one of the plurality of secondary, portable storage systems comprises a key fob, and wherein storing the reduction value and the date in which the reduction value is calculated is performed when the key fob is placed in an ignition system of the vehicle.

12. The method of claim 8, further comprising:
    storing the odometer value from the first storage system in the one of the plurality of secondary, portable storage systems, in response to the comparing and upon determining the odometer value from the one of the plurality of secondary, portable storage systems is less than or equal to the odometer value from the first storage system.

13. The method of claim 12, further comprising:
    comparing a maximum odometer value stored in the one of the plurality of secondary, portable storage systems to the odometer value stored in the first storage system; and
    upon determining the maximum odometer value is less than the odometer value from the first storage system, storing the odometer value from the first storage system as a new maximum odometer value in the one of the plurality of secondary, portable storage systems.

14. The method of claim 8, further comprising:
    distinguishing driving events among multiple ones of the plurality of secondary, portable storage systems, each one of the plurality of secondary, portable storage systems having an identifier stored thereon, including distinguishing odometer values stored on each one of the plurality of secondary, portable storage systems according to the respective identifier.

15. A computer program product comprising a non-transitory computer-readable storage medium having instructions embodied thereon, which when executed by a computer processor, cause the computer processor to implement a method, the method comprising:
    reading an odometer value for a vehicle from a first storage system via an odometer that is communicatively coupled to the computer processor, the odometer value corresponding to an accrued mileage obtained from the odometer, the accrued mileage determined at a beginning of a current driving event, the first storage system configured to track all accrued mileage from the odometer;
    reading an odometer value for the vehicle from a second, portable storage system, the odometer value from the second, portable storage system corresponding to a mileage reading obtained for the vehicle at the beginning of a driving event that precedes the current driving event, the second, portable storage system comprising one of a plurality of secondary, portable storage systems, wherein each of the plurality of secondary, portable storage systems store accrued mileage attributable to a driving event associates with a corresponding one of the plurality of secondary, portable storage systems;
    comparing the odometer value from the first storage system to the odometer value from the one of the plurality of secondary, portable storage systems;
    calculating a reduction value from the difference between the odometer value from the first storage system and the odometer value from the one of the plurality of secondary, portable storage systems, in response to the comparing and upon determining the odometer value from the one of the plurality of secondary, portable storage systems is greater than the odometer value from the first storage system, the reduction value indicative of a mileage rollback event with respect to the odometer; and
    storing the reduction value in the one of the plurality of secondary, portable storage systems.

16. The computer program product of claim 15, wherein the first storage system is a memory device internal to the vehicle control system.

17. The computer program product of claim 15, wherein the one of the plurality of secondary, portable storage systems comprises a memory device internal to at least one of:
    a key fob; and
    a smart phone;
    wherein the storing further includes storing a date in which the reduction value is calculated and a location of the vehicle in the second storage system.

18. The computer program product of claim 17, wherein the one of the plurality of secondary, portable storage systems comprises a key fob, and wherein storing the reduction value and the date in which the reduction value is calculated is performed when the key fob is placed in an ignition system of the vehicle.

19. The computer program product of claim 15, wherein the instructions further implement:
- storing the odometer value from the first storage system in the one of the plurality of secondary, portable storage systems, in response to the comparing and upon determining the odometer value from the one of the plurality of secondary, portable storage systems is less than or equal to the odometer value from the first storage system.

20. The computer program product of claim 19, wherein the instructions further implement:
- comparing a maximum odometer value stored in the one of the plurality of secondary, portable storage systems to the odometer value stored in the first storage system; and
- upon determining the maximum odometer value is less than the odometer value from the first storage system, storing the odometer value from the first storage system as a new maximum odometer value in the one of the plurality of secondary, portable storage systems.

* * * * *